United States Patent [19]

Horiuchi et al.

[11] Patent Number: 4,536,637
[45] Date of Patent: Aug. 20, 1985

[54] METHOD FOR PREVENTING THE DISCOLORATION OF AREAS AROUND INDENTATION IN SPOT WELDING

[75] Inventors: Hajimu Horiuchi; Akira Sakaguchi, both of Kobe, Japan

[73] Assignee: Kawasaki Jukogyo Kabushiki Kaisha, Japan

[21] Appl. No.: 595,478

[22] Filed: Mar. 30, 1984

[30] Foreign Application Priority Data

Apr. 4, 1983 [JP] Japan .................................. 58-59795

[51] Int. Cl.³ ............................................. B23K 11/16
[52] U.S. Cl. .................. 219/117.1; 219/118; 219/91.2
[58] Field of Search .............. 219/86.1, 91.2, 117.1, 219/118

[56] References Cited

U.S. PATENT DOCUMENTS 1,804,054  5/1931  Miller ............................ 219/86.1 X
3,789,184  1/1974  Piepers et al. ...................... 219/91.2
4,154,999  5/1979  Pinfold et al. ...................... 219/74 X

FOREIGN PATENT DOCUMENTS 72750  6/1978  Japan ................................. 219/91.2

Primary Examiner—Roy N. Envall, Jr.
Assistant Examiner—C. M. Sigda
Attorney, Agent, or Firm—Leydig, Voit and Mayer, Ltd.

[57] ABSTRACT

A method for preventing discoloration of the area around an indentation in spot welding is provided in which the weld zone and its surrounding area are masked with a non-oxidizing gas such as argon gas, helium gas, nitrogen gas or a mixture of argon gas and carbon dioxide gas from ambient atmospheric air and spot welding is carried out in the atmosphere of the non-oxidizing gas to prevent the discoloration from occurring at the weld zone of a metal sheet under the influence of heat during spot welding.

10 Claims, 4 Drawing Figures

METHOD FOR PREVENTING THE DISCOLORATION OF AREAS AROUND INDENTATION IN SPOT WELDING

BACKGROUND OF THE INVENTION

1. Field of the Invention

This invention relates to a method for preventing discoloration from occurring at the area around indentation in the welded zone of a sheet metal under the influence of heat during spot welding.

2. Description of the Prior Art

As is well known, spot welding is a type of resistance welding method in which two metal sheets to be joined are held and strongly pressed between the rod-shaped pure copper or copper alloy electrodes and a high electric current is passed therethrough for a short period of time to form a so-called nugget of a small disc shape at the contact area between said two metal sheets. The nugget is invisible from the outside, and only a slight indentation formed as a result of strong holding by the electrodes can be seen on the surface on each side of the metal sheets welded.

Thanks to its many advantageous features such as high working rate, high welding efficiency and applicability to welding of light alloys, spot welding is widely utilized in the manufacture of various industrial products such as aircraft, automobiles, railway vehicles and other similar or smaller-sized products such as household goods. However, in certain types of products which are put to use without their surfaces coated with paint, such as stainless steel, common steel, aluminum, aluminum alloy, copper or copper alloy products, and etc., spot welding involves the serious problem of discoloration that occurs at the area around indentation in the spot welded zone. Such discoloration not only impairs the external appearance of the product but also necessitates a great deal of labor and time for its elimination which requires an extra finish treatment.

The cause of occurrence of such discoloration on the spot welded metal surface is explained as follows: as electric current is applied to the electrodes holding the metal sheets to be joined, the weld zone is heated to a high temperature and the surrounding area, exposed to the ambient atmospheric air, is oxidized by the action of oxygen in the atmospheric air, thereby forming a ring-shaped yellow- or brown-colored (discolored) region.

The central part of the welded zone to which the ends of the electrodes are pressed remains almost free of discoloration, because this area is substantially kept out of contact with atmospheric air and also the inside of the electrodes are cooled by cooling water which circulates therein so that the electrodes themselves will not be overheated and softened.

As countermeasures to such phenomenon of discoloration, there are known roughly the following two types of methods: the discolored surface area is decolored by means of electrolytic polishing or pickling; and, as schematically illustrated in FIG. 1, the surface areas 02a near the welded zone of each sheet metal 02 being joined, against which the ends of the rod-shaped electrodes 01 abut, are showered with cooling water 03 throughout the period of electric current application to cool the heated areas to thereby prevent the discoloration from occurring in these areas. Either of these methods has been suitably employed.

Of these conventional practices, the former decoloring method is an operation for eliminating the discoloration after it has once been allowed to occur. Such operation is purely an extra step, and the labor and time used therefor may be said to be redundant. On the other hand, the latter method, i.e., a discoloration preventing method, is incapable of consistently affording the desired cooling effect as the water supplied to the area around the indentation on the welded metal surface 02a readily boils. Also, use of a large volume of cooling water for giving the desired cooling effect leads to not only a undesirable working environment but also an adverse effect on the quality of spot weld itself. It is thus very difficult with this method to consistently effectuate the necessary and sufficient cooling of the heated weld zone and, therefore, one could not expect an always perfect discoloration preventing effect by this method.

SUMMARY OF THE INVENTION

In view of these circumstances, this invention has been worked out with the object of doing away with said difficulties, disadvantages and other problems of the conventional methods for eliminating or preventing the discoloration that would occur at the area around indentation in the weld zone in the course of spot welding.

Said object of the invention has been accomplished by a method featured by the idea of barriering the weld zone and its surrounding area, which are liable to discoloration, with a pertinent inert gas or non-oxidizing gas to keep said area off the ambient atmospheric air so that spot welding is conducted in the atmosphere of said inert or non-oxidizing gas to thereby prevent the discoloration from occurring in said area of weld under the influence of heat.

DETAILED DESCRIPTION OF PREFERRED EMBODIMENTS

This invention will be described in detail below by way of its embodiments illustrated in the accompanying drawings.

The method of this invention is applicable to any known metal materials and other analogous materials that can be spot welded.

For practising the method of this invention, a spot welder is provided with a blow-out port(s) of an inert gas or non-oxidizing gas (such gas being hereinafter referred to as non-oxidizing gas) at a position(s) close to or in the neighborhood of electrodes so that said gas is ejected from said port(s) toward the area around the electrodes or said gas is effused so that the whole weld zone is masked with this gas from the ambient atmospheric air.

Figure 1:
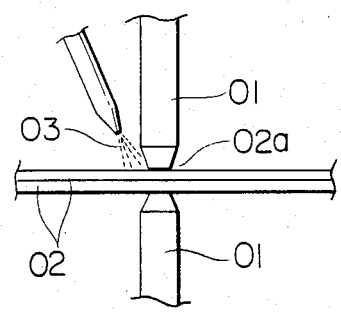
FIG. 1 is a schematic illustration of a conventional method for preventing the discoloration of the area around an indentation in spot welding.
Figure 2:
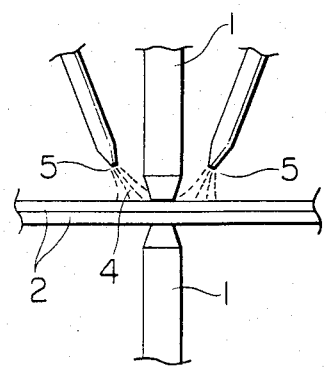
FIGS. 2 to 4 are schematic illustrations of the three different modes of embodiments of the method according to this invention.
Figure 3:
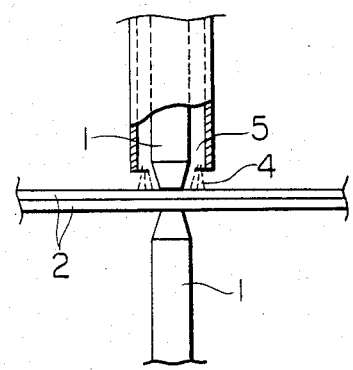

FIG. 2 is a schematic view of a gas feed pattern in the case where non-oxidizing gas 4 is blown out at locations near electrode 1, and FIG. 3 is a similar view illustrating the case where gas 4 is effused downward annularly from the periphery of electrode 1. In these two embodiments, it is intended to prevent the discoloration on the surface of one of metal sheets 2, 2 to be joined (the upper side metal sheet in the drawings), but it will be obvious that in the case where it is desired to prevent the discoloration on both the sides, a similar arrangement is applied to the lower side metal sheet, too. The non-oxidizing gas blow-out port 5 may be diversified in its shape and size, and any proper combination of shape and size can be employed, provided that it meets the certain conditions mentioned later.

Figure 4:
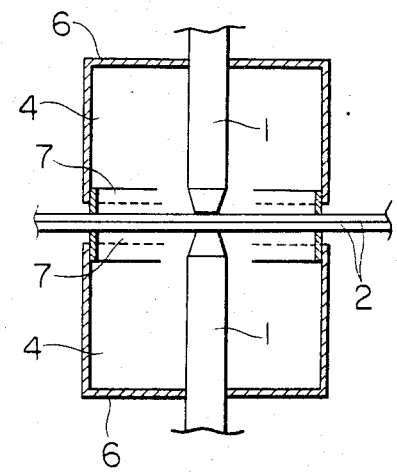

FIG. 4 illustrates an embodiment where the area around the weld zone on each side of sheet metal being joined is enclosed by casing 6 which is filled with non-oxidizing gas 4. This embodiment is especially suited for the case where multiple-spot welds are to be made simultaneously or where sheet metals 2 are spot welded continously by moving said metal sheets at given intervals.

The casing 6 may be designed either so as to enclose only the area around the electrodes 1, or so as to cover up the whole spot welding equipment so that the welding work can be done inside the casing. The former design is preferred when it is desired to reduce the amount of the non-oxidizing gas consumed, and the latter design is suited for the case where the relatively small-sized parts are dealt with.

In either case, it is advisable to provide sealing 7 at pertinent locations for avoiding wasteful leakage of the non-oxidizing gas, and the non-oxidizing gas 4 may be replenished as desired.

In spot welding, the surface area where the discoloration occurs, in other words, the surface area exposed to high temperatures may naturally vary depending on welding conditions such as current strength, pressure, time duration of current flow and configuration of the ends of electrodes, but it is possible to attain the proper discoloration preventing effect corresponding to any such variation of discoloration area by adjusting the feed of the non-oxidizing gas. Also, for achieving the perfect prevention of discoloration, it is desirable that even after the current flow to the ends of electrodes has been stopped, the ends of electrodes are not immediately separated from the surfaces of the welded metal sheet but left for a while in a state of being masked with the non-oxidizing gas from the atmospheric air.

The non-oxidizing gas used in the method of this invention is preferably an inert gas, such as argon gas and helium gas, nitrogen gas, or a mixed gas of argon gas and a small quantity (up to about 20% by volume) of carbon dioxide gas.

In the case of using a gas feed system in which the electrode 1 is covered concentrically with an outer cylinder so that the annular blow-out port 5 for the non-oxidizing gas 4 is formed circumferentially around the electrode as in the embodiment shown in FIG. 3, it is generally desirable that the inner diameter of said outer cylinder, though variable in accordance with the outer diameter of the electrode used, be so selected that the following gas flow rate will be provided:

| Type of non-oxidizing gas | Flow rate |
| --- | --- |
| Argon gas | approx. 5 l/min. or higher |
| Nitrogen gas | " |
| Helium gas | " |
| Mixture of argon gas (about 80% by volume) and carbon dioxide gas | approx. 30 l/min. or higher |

| Type of non-oxidizing gas | Flow rate |
| --- | --- |
| (about 20% by volume) | |

As understood from the foregoing description, the method for preventing the discoloration of the area around indentation in spot welding according to this invention can warrant the following eminent advantages over the conventional methods:

(1) Since the method of this invention can be free from a troublesome and nonproductive decoloring operation which has been unavoidable in the conventional decoloring systems which make use of electropolishing or pickling, labor and time required for the whole welding operation can be greatly saved.

(2) The working environment is markedly improved in comparison with the conventional method using cooling water, and also since a non-oxidizing gas which is easy to treat and easy to control in its flow rate is used, the masking of the weld zone or entire sheet metal being joined from the atmospheric air can be easily done, making it possible to attain an enhanced discoloration preventing effect.

(3) Since the welding is carried out in a non-oxidizing gas atmosphere, the oxidization of the electrode itself is prevented and also the consumption of the electrode is reduced to allow a prolongation of the necessary electrode end polishing cycle, which contributes to the improvement of productivity.

(4) The dust and other fine contaminants adhering to the surfaces of the parts being joined are swept away by a jet of the non-oxidizing gas, contributing to the qualitative improvement of the appearance of the weld.

What is claimed is:

1. A method for preventing the discoloration of an area around an indentation formed in spot welding stainless steel, comprising masking a weld zone and its surrounding area from ambient atmospheric air with non-oxidizing gas, conducting spot welding in an atmoshpere of said non-oxidizing gas to thereby prevent the discoloration from occuring on the welded metal surface under the influence of heat during spot welding.

2. A method according to claim 1, wherein the non-oxidizing gas is argon gas, helium gas, nitrogen gas, or a mixed gas of argon gas and carbon dioxide gas.

3. A method according to claim 2, wherein the amount of carbon dioxide gas in said mixed gas is up to about 20% by volume.

4. A method according to claim 2, wherein the flow rate of argon gas is about 5 l/min. or higher.

5. A method according to claim 2, wherein the flow rate of nitrogen gas is about 5 l/min. or higher.

6. A method according to claim 2, wherein the flow rate of helium gas is about 5 l/min. or higher.

7. A method according to claim 2, wherein the flow rate of the mixed gas of argon gas and carbon dioxide gas is about 30 l/min. or higher.

8. The method according to claim 1, wherein said non-oxidizing gas is blown out at a position(s) close to or in the neighborhood of an electrode(s) during spot welding.

9. The method according to claim 1, wherein said non-oxidizing gas is effused downward annularly from the periphery of an electrode(s) during spot welding.

10. The method according to claim 1, wherein said non-oxidizing gas fills a casing enclosing an area around the weld zone of metal sheets to be joined, during spot welding.

* * * * *